Jan. 21, 1936.                M. SCHLEICHER ET AL                2,028,626
                                REMOTE CONTROL DEVICE
                                 Filed Nov. 7, 1927           5 Sheets-Sheet 1

INVENTORS
MANFRED SCHLEICHER
LEO BRANDENBURGER
BY
ATTORNEYS.

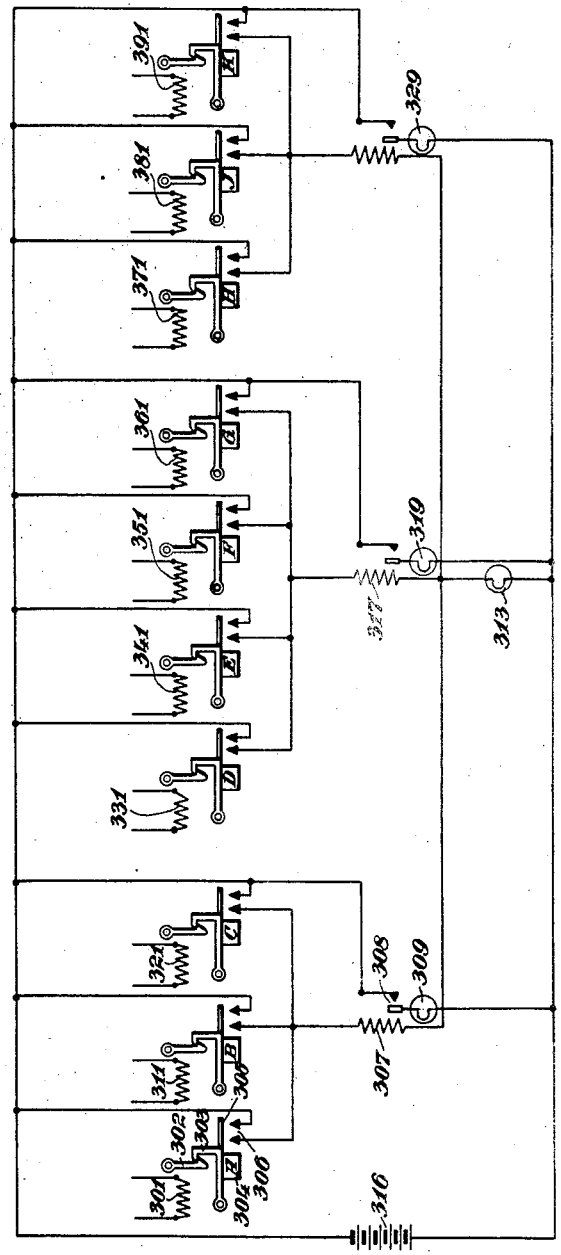

Jan. 21, 1936.  M. SCHLEICHER ET AL  2,028,626
REMOTE CONTROL DEVICE
Filed Nov. 7, 1927   5 Sheets-Sheet 4

INVENTORS
MANFRED SCHLEICHER
LEO BRANDENBURGER
BY
ATTORNEYS.

Patented Jan. 21, 1936

2,028,626

UNITED STATES PATENT OFFICE 2,028,626

REMOTE CONTROL DEVICE

Manfred Schleicher, Berlin-Charlottenburg, and Leo Brandenburger, Berlin-Halensee, Germany, assignors to Siemens & Halske, Aktiengesellschaft, Siemensstadt, near Berlin, Germany, a corporation of Germany Application November 7, 1927, Serial No. 231,684
In Germany November 11, 1926

4 Claims. (Cl. 177—311)

Our invention relates to improvements in remote control devices which permit of indicating at the main station the positions of adjustable units at a sub-station.

Remote control devices are known in which the positions of adjustable units are indicated by hand-operated position indicators at a supervisory station, designated hereafter "main station".

According to the invention, the position indicators are each coupled to a switch which is electrically so connected to a switch—controlled by the associated adjustable unit—as to produce an alarm circuit, if the position of a position indicator is not in accordance with that of its adjustable unit. The alarm signal induces the attendant to look after the position indicator concerned and to throw it to the new indicating position. This is, as it were, a "receipt" given in order to advise that he has noticed the change. For that reason, the switch connected to the hand-operated position indicator will be referred to hereafter as "receipt" switch. The handle which is to be thrown over on each position variation of one of the adjustable units may be either connected to the position indicator or utilized itself as such.

Indicating devices according to the invention indicate not only the positions of oil switches, but also those of other adjustable units, such as vapour or water taps, of pointers indicating whether a given pressure or voltage is exceeded or has dropped below a given value and the like. Moreover the problem solved by the invention is not only involved in the supervision of electric distributing systems but also in the operation of other systems.

The invention is of extreme importance for such remote control devices as permit the units situated at the sub-stations to be not only supervised but also controlled from the main station. In this connection the invention can be most suitably utilized.

Figure 4:
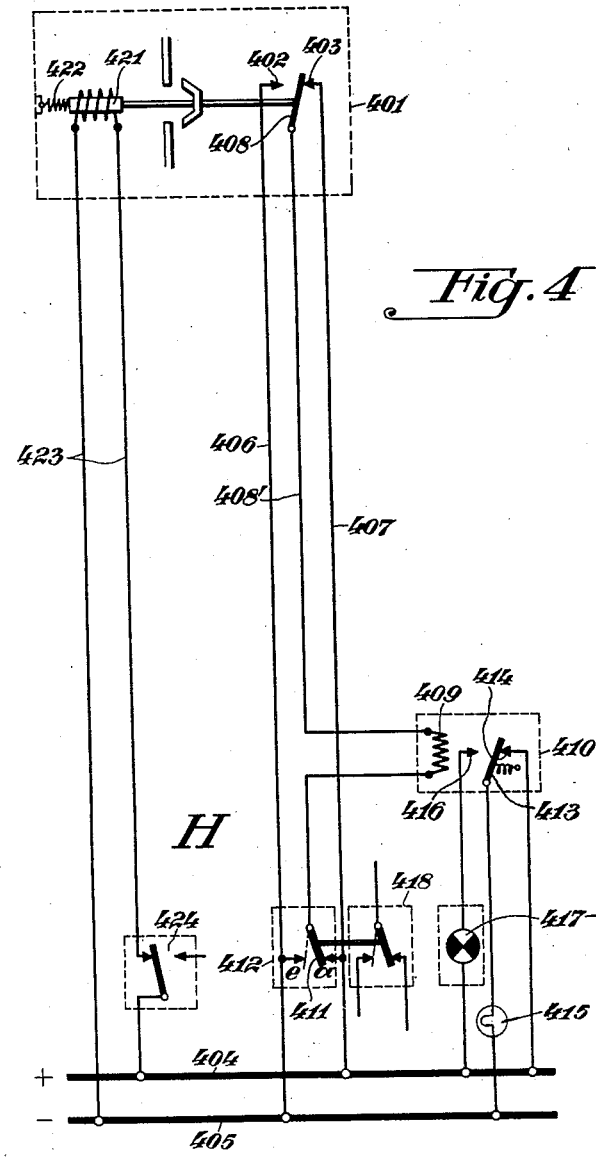
Figure 5:
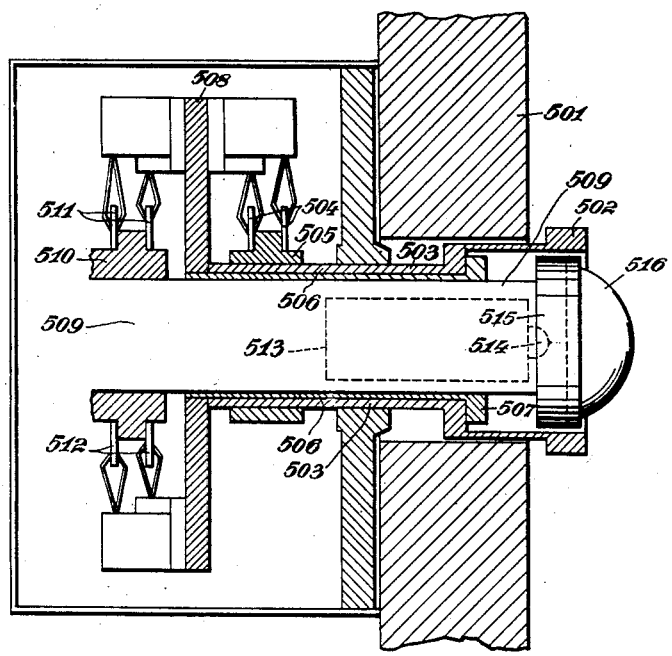
Figure 6:
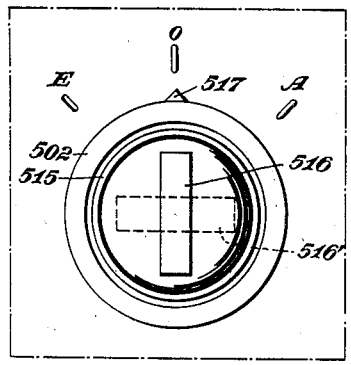
Figure 7:
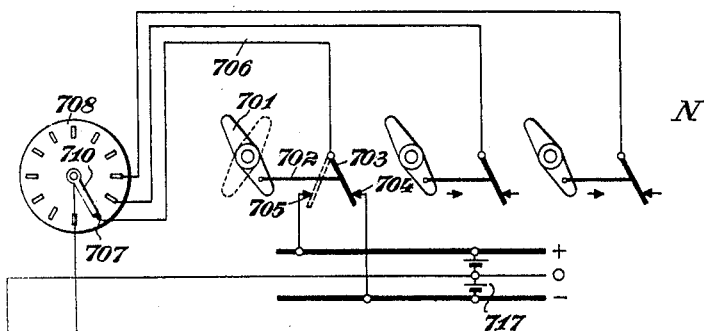
Figure 8:
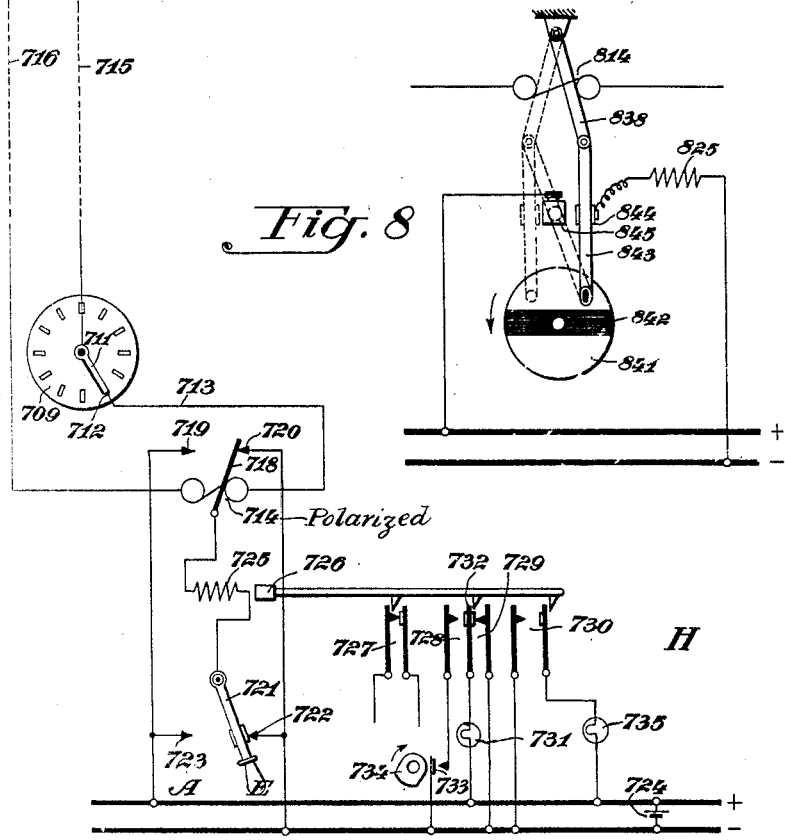

Reference is to be had to the accompanying drawings, in which Fig. 1 is a diagrammatic view of one form of the invention; Fig. 2 is a view illustrating in detail a part of the device shown in Fig. 1; Fig. 3 is a diagrammatic view of another form of the invention; Fig. 4 is a diagrammatic view of a form of the device in which individual electrical connections extend between each adjustable unit and its control member; Figs. 5 and 6 are sectional and front views respectively of switching and signalling means included in the invention; Fig. 7 is a diagrammatic view illustrating a preferred form of the invention arranged to include the devices of Figs. 5 and 6, and Fig. 8 is a detail view showing another means which may be included in Fig. 7.

At the main station H, a contact arm 1 sweeps over a series of working contacts, placed on a contact disc 2. At the sub-station N, a corresponding switch arm 3 passes over the working contacts of a contact disc 4. In any way whatever, provision is made for the two contact arms 1 and 3 to rotate synchronously so that they are made to touch their relative contacts simultaneously. For instance they could be driven by synchronous motors which are connected to the same alternating current mains; it is however also known to stop the contact arms after each revolution, or after a given fraction of a revolution, and simultaneously to start them again by a current impulse. The manner in which the synchronous working is ensured, is of little consequence for the invention. By way of example, the process of controlling is illustrated for two of the units to be controlled in the sub-station. The control for the remaining or additional units could be carried out in the same way. One of the units is controlled for instance by means of a spindle 5. On the same is mounted a two-armed lever 6 which is brought to one or the other of its positions by the working magnets 7 and 8. The working magnet 7 is connected to the working contact 9, and the working magnet 8 to the working contact 10. The corresponding working contacts 11 and 12 in the main station, are connected to contacts 13 and 14, one or the other of which can be connected by means of a control switch 15 to the source of current 16. If for instance the contact 14 is closed by the control switch 15, a current will flow, as soon as the contact arms 1 and 3 have reached the working contacts 12 and 10, from the source of current 16 through a closed contact 69, the control switch 15, contact 14, working contact 12, contact arm 1, line wire 17, contact arm 3, working contact 10, working magnet 8, wire 18 and the line wire 19 back to the source of current 16. The working magnet 8 in such case brings the double armed lever 6 into the desired other position, which is opposite to that shown in Fig. 1.

To ensure that the reversal of the lever 6 shall be indicated at the main station, it is connected by a rod 20 to a switch 21. The latter in its new position closes a contact 22 which is connected to the working contact 23. To the latter corresponds in the main station the working contact 24 from which a wire leads to a contact 25. Against the latter contact rests a switch 26 which is connected through a working magnet 27 and a wire 28, to the source of current 16. As soon as the contact arms have reached the working contacts 23 and 24, the working magnet 27 will be energized and will pull back or disengage a locking lever 68 which held locked a falling switching shutter 29 shown in Fig. 1 as a drop element or bar. This element or bar will then fall down and close a contact 30 through which current will be sent to an alarm bell 31. At the same time, the falling bar will open the contact 69, so that any further operations of the control switch 15 will be prevented for the present. The alarm causes the attendant or watchman to ascertain which bar has dropped. In order to stop the alarm signal 31, he must turn a corresponding switch 26 by means of the handle 33 into its other position. The switch 26—the "receipt" switch—when thus turned closes the contact 32. The handle 33 is provided with a finger 34 by means of which the drop bar 29 is raised again, the signal 31 is thereby stopped, and the control circuit closed again by the contacts 69. The same handle 33 as a position indicator shows by its position also the new position of the organ turned over in the subsidiary station N. That may be for instance an oil switch which has been closed. A line mark on the handle 33 indicates the closed position.

The second position indicator 35 shown in the drawings, is in the position in which it indicates the closed position of an oil switch. The corresponding control switch 36 has been however just turned over and produced the turning over of the lever 39 in the subsidiary station through the working contacts 37 and 38. The lever 39 is controlled by two working magnets which are connected to the working contacts 38 and 66. For the sake of clearness, the connection wires are merely indicated. Owing to the movement of the lever 39, by which the oil switch connected to it has been opened, during the further rotation of the contact arms over the working contacts 40 and 41, a circuit has been closed through which the working magnet 42 has been energized, so that the drop bar 43 has been caused to fall. It opened in falling, the contacts 100, and by closing the contacts 44 started the alarm bell 31. The attendant must then turn over the handle of the position indicator 35, so that the position indicator indicates the open position. In that way, the drop bar 43 is raised again, the alarm signal interrupted, and the interruption of the control current circuit is again eliminated.

The position of the oil switches in the subsidiary station depends however not only on the controls sent from the main station; on the contrary, these oil switches can also be opened by hand or by means of relays which become operative for instance in the case of a short circuit or of an earth leakage, in order to disconnect a damaged line section from the mains. Let it be assumed that the oil switch connected to the lever 39, has been opened by the line protection relay, and not by turning over the control switch 36. The latter is therefore situated, unlike as shown in the drawings, on the contact 45. The notification of the opening of the oil switch will nevertheless reach the main station in the same way as just described, and will release the drop bar 43. As long as it remains in the released position, the control switch 36 does not become operative, even when the contact arms 1 and 2, during their next revolution, reach the working contacts 46 and 66, for the control circuit is open at 100. As soon however as the drop bar 43 is raised again by turning over the position indicator 35, the oil switch 39 will be switched in again at the next revolution of the contact arms, and if the line fault has not been yet eliminated, the switch will be opened again by the line protection device and so on.

In order to prevent such undesired control operations, according to the invention care is taken to see that a control switch shall never be able to remain in a contact position, but must be brought back to its central position before the corresponding position indicator can be turned over. This can be done in a simple manner by means of a locking device which is shown in Figure 2 for the control switch 15 and the position indicator 33. The control switch which is marked 15 in Figure 1, is constituted here by a disc 101 with a projection 47, by means of which in one end position the contact 13 is closed and in the other end position, the contact 14. In the central position, both contacts are open. The disc 101 is provided with a key hole. The key is constituted by a pin 102, which is shown in the figure in section, and provided at the bottom end with the projections 103. To the position indicator 33 is rigidly secured a cam disc 49 which passes in front of the key hole of the disc 101. The cam disc has two recesses 104 and 105 which in the two positions of rest of the position indicator 33, uncover the key hole, but prevent the disc 49 from turning when the key is introduced. In front of the disc 101 is mounted a key plate, not shown in the drawings, with a key hole which enables the key to be introduced and withdrawn only in the central position shown, whilst in the contact positions it holds fast because of the pins 103. If for instance the lever 6 in Figure 1 is to be turned over, the key is introduced into the disc 101 (Figure 2) and turned to an angle of 45 degrees in the anti-clockwise direction. In that way the contact 14 will be closed and as soon as the contact arms reach the working contacts 10 and 12, the working magnet 8 will turn over the lever 6. The switch 21 will close the contact 22 and cause the disc 29 to fall. The attendant cannot however turn over the position indicator 33 as it is locked by the key. He must therefore first turn the key, and therefore the control switch, back to the central position, and withdraw the key; only then will it be possible to turn over the position indicator 33 and stop the alarm signal 31 and to re-establish the control circuit through the contacts 69.

When however all the control switches are always in the central position, the attendant will be unable to see whether a switch position in the subsidiary station has been brought about by the control operation performed by him, or automatically by the subsidiary station. For that reason a separate indicator 53 is provided (Figure 2) which is secured to a "drag" disc 54. This disc is loosely mounted on a spindle 55, about which is rotatable also the gear wheel 56. It meshes with a gear wheel 57 which is rigidly secured to the disc 101. The gear wheel 56 has a tappet pin 58 which projects into a recess of the drag disc 54. The position of the indicator 53, shown in the drawings, shows that the previous control operation was intended to produce an opening of the oil switch. If however the disc 101 is turned to one eighth of a revolution, in such a manner that the contact 14 is closed, the gear wheel 56 which is half the size, will make a quarter of a revolution, and the tappet pin 58 will drive the drag disc 54, and therefore also the indicator 53, into the new position. On the return of the control switch to the central position, the pin 58 will come back again to the previous position, but without driving the drag disc 54, on the contrary it will engage only with the other edge of the recess. In that way, the indicator 53 will always indicate the last control position.

A particularly unfavourable accident may cause the line protection devices to automatically open for instance the oil switch connected to the lever 6, directly after it had been closed by the control switch 14 through the working contacts 10 and 12. When then the contact arms pass over the signalling contacts 23 and 24, no signal arrives at the main station, as the oil switch is already again in the position shown, that is to say the contact 22 is open. The attendant is then still waiting for the "signal" that his control has been effected, and leaves therefore the control switch 15 on the contact 14. During the next revolution of the contact arms, the oil switch will be closed again in order to be at once thrown out again by the line protection relays. Such an undesired working is avoided according to the invention by inserting between the lever 6 connected to the oil switch, and the switch 21, a retardation device not shown which, when the oil switch is brought into the open position shown, retards the opening of the contact 22 and the closing of the contact 122. The time of retardation is calculated in such a manner that it is greater than the time which the contact arm 3 requires in order to pass from the working contact 10 to the signalling contact 23. The contact 22 is on the contrary closed without any retardation. If then the oil switch is opened again by the line protection relays immediately after the switching in of the working magnet 8, the switch 21 will still remain on the contact 22, until the signalling takes place through the working contact 23; only then the switch 21 will follow the movement of the oil switch, and during the next revolution, will send the signal of the automatic opening. The time of retardation for the contact 122 can be calculated exactly in such a manner that the compliance with an opening control operation, will be indicated through the working contact 9 at the same revolution through the signalling contact 123. For the sake of greater safety, the time of retardation could be however made somewhat longer, and one can put up with the fact that the back notification as to the opening of the switch, will come in only after the next revolution of the contact arms.

The position indicators 33 and 35 which at the same time form handles, can be arranged in a particularly clear manner by causing them to rotate in the recesses of a cover plate which in Fig. 1 is provided with marks 61 and 62. In the position shown, the position indicator 33 indicates the open position of an electric switch, whilst the indicator 35 indicates in a particularly clear manner the closed position. The position indicators 33 and 35 and so on, can be arranged, and the marks 61 and 62 and so on, connected together, in such a manner as to produce a plan of the whole network, within which the position indicators 33, 35 etc. give the switch position. When such network plans are more extensive, it is advisable to arrange them separate from the operating board. In such a case, the position indicators 33 will not themselves be made into handles, but the position indicators will be arranged separately and controlled by the handles, for instance electrically through auxiliary contacts which are closed by the handles 33, 35 etc., in their end positions. The remote-controlled position indicators are situated within a plan of the whole distribution network, which can be arranged at will at a more or less considerable distance from the operating board.

The possibility of seeing quickly at a glance the conditions of working of a network by means of the network plan, is of the greater importance, the quicker during automatic changes of the oil switch positions, the corresponding position indicators are discovered and turned over by the supervisor or watchman. For that reason, the supervision or watching device is improved by operating, in addition to the alarm signal allotted to each single position indicator, also a group signal which is one and the same for all the alarm signals relatively to one group. Moreover, a further alarm signal is provided for all the groups. After this alarm signal has indicated that a change had taken place, the group signal makes it possible to see at a glance in which group of the installation, for instance on which switchboard field, the attendant has to look for the moved switches. This saves him the necessity of examining all the fields, on the contrary he has to look only for the single signal given merely in the switchboard field concerned, which means a great saving of time. Even when several single signals appear simultaneously, this examination will be materially facilitated.

A connection suitable for carrying out the invention, is shown by way of example in Figure 3. As soon as a change has taken place in the substation, for instance on a switch, a given relay 301 allotted to the switch in question will be energized through the intermediary of the remote control installation which is not shown. Consequently, the pawl 302 will release a bell crank lever 303. The latter carries a drop bar 304 and closes moreover, by means of its contact blade 305, the contacts 306. The dropped bar 304 is the single signal corresponding to the single oil switch, in the case assumed it will notify the attendants that the switch A has made a movement. By means of the contact blade 305 and contacts 306, the alarm signal 3131 which is one and the same for all the parts to be supervised and is shown here as a signal lamp, is connected to the source of current 316. The lamp 3131 will therefore light up. Moreover, a relay 307 will be energized which will close a switch 308 which will connect the group lamp 309 also to the source of current 316, so that the latter lamp will also be lit. The relay 307 is arranged in a lead to the alarm signal 3131, which lead is one and the same for the three relays 301, 311 and 321. The group lamp 309 will therefore always light up and always only when one of these three relays has become operative. The group lamp 319 will be on the contrary switched in by a relay 317 which is situated in those leads to the alarm signal 3131, which are closed by the relays 331, 341, 351 and 361; in the same way, the group lamp 329 belongs to the relays 371, 381 and 391. According to which of the three group lamps 309, 319 or 329 lights up, the attendant will know in which group he has to look for the fallen drop bar. The drop bar is provided with a mark, A, B, C etc., which characterizes the corresponding switch or the corresponding adjustable organ.

In order to facilitate the attendance still more, the group can be constituted in a different manner. The single sub-stations can be combined to groups, but also all the oil switches can be taken up in one group, and the other switches which for instance are closed when the highest temperature, highest pressure etc., is exceeded, combined to another group.

The quick finding of the alarm signal corresponding to an automatically released switch, is also facilitated by the use, in place of the drop bar, of a signal which is much more striking than a drop bar, namely a signal lamp which gives flashing or flickering light until the position indicator correctly indicates again the new position of the oil switch switched in or out; then it gives a steady light. The attention of the watchman is therefore at once drawn thereby to the switch in question, so that any searching becomes unnecessary. Moreover, a trouble in the lamp, for instance a burning out or a loosening in the mount, can be easily noticed, as then it neither gives a steady nor flickering light, but goes out completely. The switch to be watched can be of course controlled by a control switch as well as for instance by hand or by a protective device. The flickering light lamp can watch the agreement of the positions of the control sender and of the receiver of a back notification installation, also without the use of a separate receipt switch.

The invention is applicable to any kind of power transmission installations or to other industries.

Figure 4 shows as an example of the application of the invention the diagram of connections for the supervision of an electric network of conductors from a main station H. Only one of the switches 401 to be supervised and arranged at a distance, is shown. The release position of this switch, shown in Fig. 4, is obtained in opposition to the action of a spring 422, by the excitation of its release coil 421 which is connected by means of wires 423, through the control switch 424, to an auxiliary source of current with the poles 404, 405. The switch 401 is provided with auxiliary contacts 402, 403 which are connected to the auxiliary source of current by wires 406, 407. According to the position of the switch, one of these two contacts 402, 403 is connected by the contact arm 408 to a third wire 408' leading to the supervision station. This wire leads through the coil 409 of a relay 410 and to the adjustable contact 411 of the receipt switch 412. When the two contact arms 411 and 408 are in a position corresponding to each other, as in the figure, in which the contact arm 411 is on the contact marked a ("off"), the two contact arms will be connected to the same pole 404 of the wire, and there will be no current in the coil 409. In this case, the contact arm 413 of the relay 410 will be on the right hand contact 414, and a lamp 415 allotted to the receipt switch, will be connected to the auxiliary source of current 404, 405 and will burn with a steady light. If on the contrary the position of the contact arm 411 of the receipt switch does not agree with that of the contact arm 408 on the switch 401 to be controlled, for instance if the contact arm 411 is in the dotted position at e ("on"), that is to say indicates wrongly the switched-in position of the switch 401, the coil 409 will be excited through this contact arm, and the contact arm 413 of the relay 410 will be moved to the other contact 416. In that way, the lamp 415 will be connected to a periodically acting contact breaker 417 and will burn with a flickering light until by turning the receipt switch 412, the correct position is brought about. In place of a mechanical contact breaker 417 there can be utilized the well known series connection of resistance and capacity, if for the lamp 415 to be connected either directly to the auxiliary source of current or parallel to the capacity, a glow light lamp is chosen.

To the receipt switch 412 can be coupled mechanically a further switch 418 by means of which any desired signal devices can be set for indicating the position of the receipt switch itself, not for the indication of the false position.

If it is desired to control from the main station also the various oil switches of the energy distributing network, it is difficult to arrange the 20 control switches and the position indicators which belong together, in a small space so that they could be seen at a glance. More particularly, the network plans lose their clearness, when, in addition to the position indicator, also the receipt switch and the alarm signal have to be taken up singly into the plan.

According to the invention, the difficulty of combining in one place in the network plan all the instruments or devices belonging together, in such a manner as to avoid disturbing the "picture" of the plan, is eliminated by making the two switches—the control and the receipt switch—in the portion passing through the table or board of the plan, in the form of concentric cylinders, and by arranging the warning or alarm signal which indicates the wrong position of the receipt switch, in the form of a lamp in the interior of the switch, the said lamp, in the event of a wrong position of the receipt switch, lighting up, more particularly giving a flickering light.

Figure 5 shows in a longitudinal section a construction according to the invention. Of the portion of the switch device, which projects in front of the front side of the board 501, the outer edge or flange 502 belongs to a hollow cylinder or sleeve 503 to which are secured by means of a ring or collar 505, the switch knives 504 of a control switch. The hollow cylinder 503 is guided on a stationary cylinder 506 which is provided at the front end with an edge or flange 507, and is secured at the rear end to a board 508, which renders impossible an axial movement of the hollow cylinder 503. In the interior of the fixed cylinder 506 is rotatably mounted a hollow cylinder 509 which by means of a ring or collar 510, carries the switch knives 511 and 512 for a receipt switch and an auxiliary switch.

In the interior of the cylinder 509 is arranged a lamp mount 513. The lamp 514 illuminates a body 516 of a transparent material such as opaque glass, celluloid, galalith or the like, which projects from the front wall 515 of the receipt switch. This projecting transparent part has preferably the shape of a ledge as shown by way of example in the front elevation in Figure 6. The position of the said ledge indicates then the position of the receipt switch 511, whilst the position of the control switch 504 is indicated by a mark 517 on the flange 502 and by the corresponding writing of the words "on" and "off" or the letters E and A on the board, or in a similar manner. The position of the receipt switch 511 for the "off" position is indicated by the dotted position 516' of the illuminated mark.

The lamp 514 which illuminates the mark for the position of the receipt switch, is preferably utilized at the same time for notifying the correct or wrong position of the receipt switch. It is used preferably in a connection which, in the event of a wrong position of the receipt switch, switches a periodic contact breaker into the circuit of the lamp, so that the latter gives a flickering light.

The utilization of the invention is not limited to switch arrangements for network plans in the supervision stations for large networks. It could be used wherever it is necessary to combine two switches belonging together, in the smallest possible space, in which case the inner space is to be utilized in any desired manner.

In the remote control installation shown by way of example in Figure 1, the position indicators 33 and 35 can be moved into a wrong position, without this fault being noticed, until the contact arms 1, 3 reach the corresponding signal contacts. Only then the bell 31 will ring. As however in most cases it is necessary to watch a large number of organs, and as a rule these are temporarily electrically connected together in a consecutive manner, for instance by means of the contact arms 1 and 3, the position indicator moved in error, frequently remains for a long time in the wrong position, before its electric connection reaches its turn.

This disadvantage is eliminated in a further modification of the present invention and more particularly the preferred form thereof shown in Fig. 7. This form of the invention is particularly adapted to utilize the devices shown in Figs. 5 and 6. According to the invention an oscillating or "pendulum" member is automatically set in accordance with the position of the organ to be watched, and co-operates with the hand operated position indicator in such a manner that when the positions of the two do not agree, the signal devices will be operated. The oscillating or pendulum member is "withdrawn from the action" by hand, that is to say when once it has taken up the correct position, it cannot be moved into the wrong position. The position indicator cannot then be moved at all into the wrong position without the alarm devices becoming operative.

In the subsidiary station N are situated the movable organs, oil switches, valves or the like, the position of which is to be watched. One of these organs, with reference to which the invention is to be described, is marked 701. It is coupled by a connecting rod 702 to a change-over switch 703 which, in the position shown, is on the contact 704.

When the movable organ 701 assumes the position shown in dotted lines, the change-over switch 703 will be on the contact 705. The change-over switch 703 is connected by a wire 706 to a contact 707 which is arranged on a disc 708. Other contacts of this disc are connected to the change-over switches of the remaining movable organs. To the contact disc 708 arranged in the subsidiary station N, corresponds a contact disc 709 in the main station H, over the contacts of these discs pass simultaneously contact arms 710 and 711, so that at the same moment when the arm 710 touches the contact 707, the arms 711 will close the corresponding contact 712. From the contact 712, a wire 713 leads to the polarized relay 714 which is connected by the line wire 716 to the zero conductor of a source of current 717 situated in the subsidiary station N.

A second line wire 715 connects together the two contact arms 710 and 711. The contact blade 718 of the polarized relay 714 plays between the contacts 719 and 720. A hand operated position indicator 721 is either, as shown, on the contact 722, or on the contact 723. The contacts 719 and 723 are connected to each other and to the positive pole of a source of current 724. The contacts 720 and 722 are also connected to each other and to the negative pole of the source of current. The contact blade 718 and the change-over switch 721 are connected together through the electromagnet winding 725. The armature 726 of the electromagnet controls the pairs of contacts 727, 728, 729 and 730. Through the contacts 727 passes a control circuit, not shown here, by means of which the control organ in the subsidiary station N to be watched from the main station H can be turned into one or the other position. It will be understood that the control circuit may be arranged and operate in the same way as in the form shown in Fig. 1. Across the contacts 729, a lamp 731 is connected to the source of current 724. This lamp is either arranged in direct proximity to the receipt switch 721 constituting the position indicator, or connected to it in any desired manner, as shown for instance in Figures 5 and 6. When the movable contact member 732 is in its other position, the contact 729 will be open, and the contact 728 closed. The lamp 731 is then connected to the source of current through a contact 733 which is alternately opened and closed by the rotating cam disc 734, so that the lamp will give a flickering light. Over the contact 730 an alarm signal 735 is connected to the source of current 724.

The working of the device is as follows:—

Let it be assumed that the movable unit 701 had been at first in the position shown in dotted lines, and has been just moved into the position shown in full lines. The contact blade 718 of the polarized relay 724 is then still on the contact 719, and the switch 721 on the contact 723. At the moment when the rotating contact arms 710 and 711 touch their contacts 707 and 712, a current impulse will be sent from the negative pole of the source of current 717 through the contact 704, change over switch 703, wire 706, contact 707, contact arm 710, line wire 715, contact arm 711, contact 712, wire 713, polarized relay 714 and through the line wire 716 back to the zero conductor of the source of current 717. The polarized relay will be excited and will bring the contact blade 718 against the contact 720. Consequently a local circuit will be closed from the positive pole of the source of current 724 through the contact 723, through the position indicator and receipt switch 721 still resting on it, the magnet winding 725, the contact blade 718, the contact 720 back to the negative pole. Consequently the electromagnet 725 will attract its armature 726. The latter will open the contact 727 and therefore the control circuit; in that way it is rendered temporarily impossible to change the position of the organ 701 from the main station H. Moreover the contact 729 will be opened and the contact 728 closed. The result of this will be that the lamp 731 will give a flickering light instead of a steady one. Further, the contact 730 will be closed, so that the alarm signal 735 will become operative, here it is shown also as a signal lamp. The alarm signal draws the attention of the staff to the fact that a change has taken place. The flickering light of the lamp 731, which constitutes a single signal, shows which of the organs situated in the subsidiary station N has been affected by the change, and the position indicator 721 situated directly on, or near, the flickering light, will be moved into the position shown, so that the contact 723 will be opened, and the contact 722 closed. In that way the electromagnet 725 will become dead, the control circuit will be again closed by the contact 727, the lamp 731 will again give a steady light and the alarm signal 735 will cease to act. The switch 721 is used at the same time as a position indicator, for instance by indicating, in the position shown over the letter E, that the organ 701 is in the "on" position, whilst the position not shown in the drawings, with the letter A, indicates the "off" position. If by an error the switch 721 were subsequently again moved into the other position, the electromagnet 725 would at once receive current again and operate both the single signal 731 as well as the alarm signal 735, so that the attendant's attention will be at once drawn to the incorrect position, and he will be forced to re-establish the correct position of the indicator 721, namely independently of the fact whether the contact arms 710 and 711 have reached again the contacts 707 and 712.

The invention is based on the arrangement in the main station H of an oscillating or pendulum member 718 which is automatically set in accordance with the position of the member 701 to be watched, and cannot be moved by hand. The hand operated position indicator 721 is electrically connected to the oscillating member 718 in such a manner that the signals are released when the position of the two does not agree.

In the construction described with reference to Figure 7, the connection of the two switch members 718 and 721 is effected electrically, it could be however effected also mechanically as shown in Figure 8.

The polarized relay 814 moves a rocking lever 838. The indicator member is shown here in the form of a rotatable disc 841, the handle 842 of which, projecting from the plane of the drawings, is intended at the same time for indicating whether the organ to be watched is in the "on" or "off" position. A connecting rod 843 is pivoted to the rocking lever 838 with such a degree of mobility that the changing over of the indicator member 841 and of the rocker lever 838 is possible. The connecting rod 843 is provided in the centre with a contact 844 which is connected to the electromagnet 825. When owing to the excitation of the polarized relay 814, the rocking lever 838 is moved into the position shown in dotted lines, the connecting rod 843 passes into the diagonal position shown dotted, and the contact 844 touches a fixed contact plate 845. The latter is connected to the positive pole, and the electromagnet 825 to the negative pole of the source of current. Owing to the contact between 844 and 845, the magnet 825 will be energized, so that in the same way as in Figure 7, the signal circuits will be closed, and the control circuit opened. The attendant must then turn the position indicator 841 in the direction of the arrow through an angle of 90°. The connecting rod 843 is then in the position at the other side, also shown in dotted lines, in which it no longer touches the contact 845. The automatic moving of the rocking lever 838, or the moving of the indicator member 841 by hand, would again operate the signals.

Having now particularly described and ascertained the nature of our said invention and in what manner the same is to be performed, we declare that what we claim is:—

1. A remote control device, comprising means to be controlled mounted at a sub-station, manually operated switch means mounted in the main controlling station, contact switch means in said main station, means at the sub-station for varying the position of said means to be controlled, an electrical circuit connecting said manually operated switch means, said contact switch means and said position varying means, said means for varying the position of said means to be controlled being controlled through said circuit by said manually operated switch means, an alarm circuit having contacts adapted to be closed by said contact switch means, manually controlled movable indicating means having switch means attached thereto, electromagnetic actuating means for moving said contact switch means to break said first circuit to render said manually operated control switch means inoperative, an electric circuit including said indicating means, the switch means attached thereto, and said electromagnetic means for moving the control switch means, said circuit being closed by movement of said means to be controlled to cause said electromagnetic actuating means to move the contact switch means to break said first circuit and simultaneously to close the contacts in said alarm circuit, means associated with said indicating means and operable thereby to return said contact switch means to its original position to close said first circuit, said manually controlled indicating means then indicating the position of said means to be controlled.

2. A remote control device, comprising means to be controlled mounted at a sub-station, manually operated switch means mounted in the main controlling station, contact switch means in said main station, means at the sub-station for varying the position of said means to be controlled, an electrical circuit connecting said manually operated switch means, said contact switch means and said position varying means, said means for varying the position of said means to be controlled being controlled through said circuit by said manually operated switch means, an alarm circuit having contacts adapted to be closed by said contact switch means, manually controlled movable indicating means having switch means attached thereto, electromagnetic actuating means for moving said contact switch means to break said first circuit to render said manually operated control switch means inoperative, an electric circuit including said indicating means, the switch means attached thereto, and said electromagnetic means, for moving the control switch means, said circuit being closed by movement of said means to be controlled to cause said electromagnetic actuating means to move the contact switch means to break said first circuit and simultaneously to close the contacts in said alarm circuit, means for breaking the alarm circuit upon manual movement of said indicating devices, said indicating devices then indicating the position of the corresponding means to be controlled.

3. A remote control device comprising means to be controlled mounted at a sub-station, manually operated members mounted in the main controlling station, an electrical circuit connected to said members and including means controlled by said members to vary the position of said means to be controlled, an electric alarm circuit including an alarm, an element movable to form a part of either of said circuits, auxiliary switches in the main controlling station, and electrical means, and connections including said auxiliary switches for energizing the said electrical means when said means to be controlled is moved to actuate said element to break said first circuit to render said manually operated members inoperative and simultaneously to close said alarm circuit, manually controlled movable indicating devices in the main controlling station, said auxiliary switches being operatively connected with said indicating devices, said indicating devices having portions for operating said movable element to open said alarm circuit and simultaneously to close said first circuit to render said manually operated members capable of operation, said manually controlled indicating devices indicating the position of the corresponding means to be controlled after the alarm has been shut off.

4. A unit to be controlled located in a sub-station, a control circuit including a control switch at a main station, means controlled by said switch for actuating said unit to be controlled, a manually operated indicating device in the main station for indicating the position of said unit, a switching device in said control circuit, an auxiliary circuit, said indicating device being movable to form a part of said auxiliary circuit, an alarm circuit, switch actuating means in said auxiliary circuit and connections for operating said switch actuating means when the position of said indicating device is not in accord with that of said unit to actuate said switching device to open said control circuit and simultaneously close said alarm circuit, means operatively connecting said indicating device with said switching device after said switching device has been actuated to close the alarm circuit, whereby the movement of said indicating device to a corresponding position with said unit results in closing said control circuit and opening said alarm circuit.

MANFRED SCHLEICHER.
LEO BRANDENBURGER.